United States Patent
Joyner et al.

(10) Patent No.: US 10,742,717 B2
(45) Date of Patent: Aug. 11, 2020

(54) ELECTRONIC CONTENT DELIVERY WITH DISTRIBUTED RECIPIENT DELIVERY PREFERENCE

(71) Applicant: ZixCorp Systems, Inc., Dallas, TX (US)

(72) Inventors: Bryan Adam Joyner, Murphy, TX (US); Kelly Sue Morrison, Dallas, TX (US); David Vincent Care, Dallas, TX (US); Waseul Islam, Garland, TX (US)

(73) Assignee: ZixCorp Systems, Inc., Dallas, TX (US)

( * ) Notice: Subject to any disclaimer, the term of this patent is extended or adjusted under 35 U.S.C. 154(b) by 895 days.

(21) Appl. No.: 14/154,755

(22) Filed: Jan. 14, 2014

(65) Prior Publication Data
US 2015/0201002 A1 Jul. 16, 2015

(51) Int. Cl.
G06F 15/16 (2006.01)
H04L 29/08 (2006.01)
G06Q 50/32 (2012.01)

(52) U.S. Cl.
CPC .............. *H04L 67/10* (2013.01); *G06Q 50/32* (2013.01)

(58) Field of Classification Search
None
See application file for complete search history.

(56) References Cited

U.S. PATENT DOCUMENTS

| 6,178,443 | B1 | 1/2001 | Lin |
| 2003/0182559 | A1* | 9/2003 | Curry ................. H04L 63/0442 713/189 |
| 2004/0139314 | A1 | 7/2004 | Cook et al. |
| 2006/0018445 | A1* | 1/2006 | Mittal ................. H04M 3/436 379/88.17 |
| 2008/0104517 | A1 | 5/2008 | Horvitz |
| 2008/0195664 | A1* | 8/2008 | Maharajh .......... G06F 17/30035 |
| 2009/0100263 | A1* | 4/2009 | Leonard ................. H04L 63/20 713/156 |
| 2010/0299522 | A1* | 11/2010 | Khambete ............. H04L 63/061 713/168 |

(Continued)

OTHER PUBLICATIONS

Marc J. Rochkind, The Source Code Control System, 1975, IEEE Transactions on Software Engineering, vol. SE-1, No. 4, pp. 364-370.*

(Continued)

*Primary Examiner* — Phyllis A Book
(74) *Attorney, Agent, or Firm* — Baker Botts L.L.P.

(57) ABSTRACT

According to some embodiments, a delivery system comprises an interface and one or more processors. The interface is operable to receive a current preference from a recipient. The current preference indicates how the recipient prefers messages to be delivered. The processors determine whether the current preference differs from a previous preference that the delivery system associates with the recipient. The interface communicates the current preference to a plurality of senders if the current preference differs from the previous preference. The senders are configured to store the current preference in local memory and to apply the current preference from local memory in response to a future determination to send a message to the recipient.

20 Claims, 4 Drawing Sheets

(56) References Cited

U.S. PATENT DOCUMENTS

| | | | | |
|---|---|---|---|---|
| 2012/0042161 | A1* | 2/2012 | Brown | H04L 12/58 |
| | | | | 713/156 |
| 2012/0117385 | A1* | 5/2012 | Bryson | H04L 9/3297 |
| | | | | 713/168 |
| 2013/0055368 | A1 | 2/2013 | Bauckman et al. | |
| 2013/0204948 | A1 | 8/2013 | Zeyliger | |
| 2014/0101775 | A1* | 4/2014 | Cheung | H04L 63/0428 |
| | | | | 726/27 |
| 2014/0168453 | A1* | 6/2014 | Shoemake | H04N 5/23206 |
| | | | | 348/207.11 |
| 2014/0208391 | A1* | 7/2014 | Farnsworth | H04L 51/28 |
| | | | | 726/4 |
| 2015/0149585 | A1* | 5/2015 | Zhang | G06Q 10/10 |
| | | | | 709/217 |
| 2015/0156172 | A1* | 6/2015 | Nandi | G06Q 30/0282 |
| | | | | 713/153 |

OTHER PUBLICATIONS

European Patent Office Communication and Search Report; Application No. 14193493.5-1958; 10 pages, dated May 7, 2015.

Anonymous, "Revision control" XP055186038, retrieved from Internet: URL:http://en.wikipedia.org/w/index.php?title=Revision_control&oldid=589765566 [retrieved on Apr. 27, 2015].

Anonymous: Replication (computing)—XP055167656; retrieved from the Internet: URL:http://en.wikipedia.org/w/index.php?title=Replicaton_%28computing%29&oldid-587233222 ; [retrieved Feb. 5, 2015].

Communication Pursuant to Article 94(3) EPC in EP Application No. 14 193 493.5-1958, dated Apr. 29, 2016, 8 pages.

European Patent Office; Summons to attend oral proceedings pursuant to Rule 115(1) EPC, mailed Mar. 3, 2017.

Decision to refuse a European Patent application in Application No. 14 193 493.5-1958, dated Aug. 8, 2017, 20 pages.

\* cited by examiner

ELECTRONIC CONTENT DELIVERY WITH DISTRIBUTED RECIPIENT DELIVERY PREFERENCE

FIELD OF THE INVENTION

The invention relates generally to electronic content delivery and more particularly to electronic content delivery with distributed recipient delivery preference.

BACKGROUND

In a computer network, a sender may transmit files, email messages, and other data to a recipient. The sender may encrypt the data to increase security in some circumstances. As an example, the sender may encrypt the data using a public key encryption technique. In public key encryption, two separate keys are associated with the recipient, a public key and a corresponding private key. The sender obtains the recipient's public key, encrypts the data using the public key, and transmits the encrypted data to the recipient. The recipient decrypts the encrypted data using its corresponding private key.

SUMMARY

According to some embodiments, a delivery system comprises an interface and one or more processors. The interface is operable to receive a current preference from a recipient. The current preference indicates how the recipient prefers messages to be delivered. The processors determine whether the current preference differs from a previous preference that the delivery system associates with the recipient. The interface communicates the current preference to a plurality of senders if the current preference differs from the previous preference. The senders are configured to store the current preference in local memory and to apply the current preference from local memory in response to a future determination to send a message to the recipient.

Some embodiments of the disclosure may provide one or more technical advantages. A technical advantage of certain embodiments may be efficient management of recipient preferences, such as encryption preferences, within a network. For example, recipient preferences may be distributed to senders and stored in local memory associated with each sender. When a sender needs to transmit data to a recipient, the sender can use the recipient preferences stored in local memory without having to ask a remote resource, such as a central server or the recipient itself, for the preferences. Thus, certain embodiments may reduce or eliminate latencies and/or bandwidth penalties associated with having to ask a remote resource for recipient preferences each time the sender needs to transmit data to the recipient. Additionally, storing recipient preferences in local memory may allow the sender to access and apply the preferences during a temporary absence of the remote resource. In some embodiments, storing recipient preferences in local memory may reduce or eliminate race conditions that would otherwise occur if a process was required to obtain the preferences from a remote resource (and therefore incur delays) each time the preference was needed.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1A:
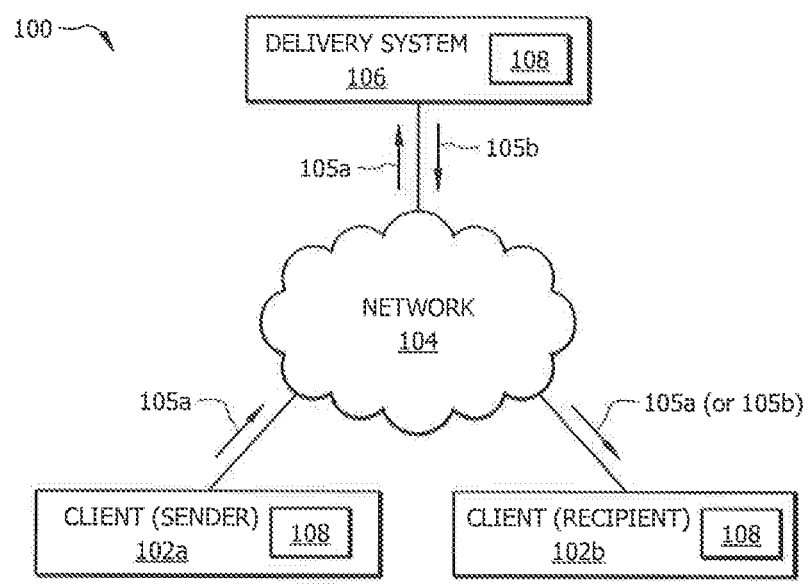
FIG. 1A illustrates an example of a system for electronic delivery of content using distributed recipient preferences.

Embodiments of the present invention are described in FIGS. 1-4 of the drawings, like numerals being used for like and corresponding parts of the various drawings.

In a computer network, a sender may transmit files, email messages, and other data to a recipient. The sender may encrypt the data to increase security in some circumstances. As an example, the sender may encrypt the data using a public key encryption technique. In public key encryption, two separate keys are associated with the recipient, a public key and a corresponding private key. The sender obtains the recipient's public key, encrypts the data using the public key, and transmits the encrypted data to the recipient. The recipient decrypts the encrypted data using its corresponding private key.

To ensure that the sender has an up-to-date public key, conventional systems may require the sender to request the recipient's public key from a remote resource (e.g., a central storage facility or the recipient itself) each time the sender wishes to transmit data to the recipient. Requesting the public key from a remote resource introduces delay and consumes internet access bandwidth. Additionally, the public key may become temporarily unavailable to the sender if the sender gets disconnected from the remote resource. Embodiments of the present disclosure may provide solutions to these and other problems.

In some embodiments, encryption algorithms and other message delivery preferences of the recipient can be made available (concurrently) to a broad population of message/content senders. Thus, decisions regarding appropriate encryption algorithms and other preferences can be made by the sender on a message-by-message basis without per-message communication back to the recipient or a central storage facility.

In some embodiments, a central storage facility houses a single accurate reference copy of all recipient security preferences, network-wide. Full copies of the entire preference data store may then be conveyed to all of the senders (e.g., sending entities) in the network and maintained as 'local stored cache' representations of the recipient preferences. After that, the central storage facility communicates recipient preferences to the senders only occasionally as may be required to keep the local copies current. For example, if an addition, deletion, or modification is made to the reference copy of a recipient preference in the central storage facility, the addition, deletion, or modification may be communicated to the senders without having to communicate any unchanged recipient preferences. If each sender maintains efficiently managed 'local caches' of all recipient preferences needed to transmit data to any recipient on the network, the senders may be able to apply the recipient preferences to messages while conserving network bandwidth and resources associated with retrieving the preferences from a remote resource on a per-message basis.

In some embodiments, the recipient preferences may be stored in a standardized format at every location to enable off-the-shelf distributed file version management technology to be used to keep file copies aligned. In some embodiments, technology that is typically used for source file control in distributed software development environments, such as Git, J/Git, Subversion, Concurrent Versions System (CVS), or ClearCase, may be used as the distributed file version management technology.

FIG. 1A illustrates an example of a system 100 for electronic delivery of content using distributed recipient preferences. In the illustrated example, system 100 includes a plurality of clients 102, a network 104, and a delivery system 106 communicatively coupled as illustrated.

Clients 102 may comprise hardware and/or software and may be capable of both sending and receiving messages 105. For a given message 105, a particular client 102 may be configured as the sender 102a or the recipient 102b. In certain embodiments, sender 102a may send a message 105 to recipient 102b according to recipient preferences 108. Sender 102a may obtain recipient preferences 108 for recipient 102b from delivery system 106 as further discussed with respect to FIG. 2 and FIG. 3 below.

Client 102 may include any suitable combination of hardware and/or software, such as a computing system comprising one or more interfaces, logic, and/or one or more memories, which are described in more detail below. In some embodiments, client 102 may comprise a gateway that manages policy enforcement and/or content delivery on behalf of a plurality of devices associated with a company or other entity. For example, a company may maintain a network through which its employees or customers access company data using laptop computers, desktop computers, mobile phones, and/or other user devices. The gateway may manage policy enforcement and/or content delivery to the user devices that access the company's network. In alternative embodiments, certain policy enforcement may occur at the user device level and client 102 may refer to the user device itself. In some embodiments, client 102 may include an email application. Client 102 may be operable to forward message 105 to a user device and/or to display message 105 on a display. Client 102 may communicate with network 104 via a wired or wireless connection.

Clients 102 may optionally include support for encrypting message 105, decrypting message 105, and/or communicating message 105 using a secure connection protocol (e.g., SSL, TLS). Prior to transmitting message 105, sender 102a may check recipient preferences 108 to determine the encryption techniques supported by recipient 102b (if any). Sender 102a may encrypt message 105 according to an encryption technique supported by sender 102a and recipient 102b. For example, the encryption technique may correspond to the most secure technique supported by both sides or to a preferred encryption technique indicated by recipient preferences 108 associated with recipient 102b. In some embodiments, the encryption technique may correspond to a public key encryption technique, such as S/MIME (Secure/Multipurpose Internet Mail Extensions), and sender 102a may determine recipient 102b's public key from the recipient preferences 108.

Recipient preferences 108 may be distributed and applied at any suitable point in the system. For example, encryption may be applied at any suitable point in the sending path (e.g., by the sending user device, by the sending gateway, or by the delivery system). Similarly, decryption may be performed at any suitable point in the receiving path (e.g., by the delivery system, by the receiving gateway, or by the receiving user device). Even if clients 102 do not support a common algorithm for encrypting and/or decrypting messages 105, message 105 may be encrypted and decrypted by including delivery system 106 in the delivery path for message 105. For example, delivery system 106 may receive message 105a encrypted according to a first technique supported by sender 102a, decrypt message 105a, encrypt message 105b according to a second technique supported by recipient 102b, and communicate message 105b to recipient 102b.

Message 105 may include address information and/or message information. Address information identifies one or more intended recipients 102b to which the message information is directed. Examples of addresses include an email address, an IP address, a phone number, or other identifier associated with the intended recipient(s) 102b. Message information may include any content to be communicated to recipient 102b. Examples of message information include data such as a file, the body of an email, or content associated with a web page, such as HTML content, XML instructions, etc. Message information may include text, drawings, photographs, video, audio, etc. In some embodiments, message 105 may refer to an email.

Delivery system 106 may include one or more servers. A server may refer to any suitable combination of hardware and/or software implemented in one or more modules to process data and provide the described functions and operations. In some embodiments, the server may include, for example, a mainframe, host computer, data center, workstation, web server, file server, a personal computer such as a laptop, or any other suitable device operable to process data. In some embodiments, the server may execute any suitable operating system such as IBM's zSeries/Operating System (z/OS), MS-DOS, PC-DOS, MAC-OS, WINDOWS, UNIX, OpenVMS, or any other appropriate operating systems, including future operating systems. In some embodiments, delivery system 106 may comprise a central storage facility that maintains and distributes recipient preferences 108.

Communication network 104 may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Figure 1B:
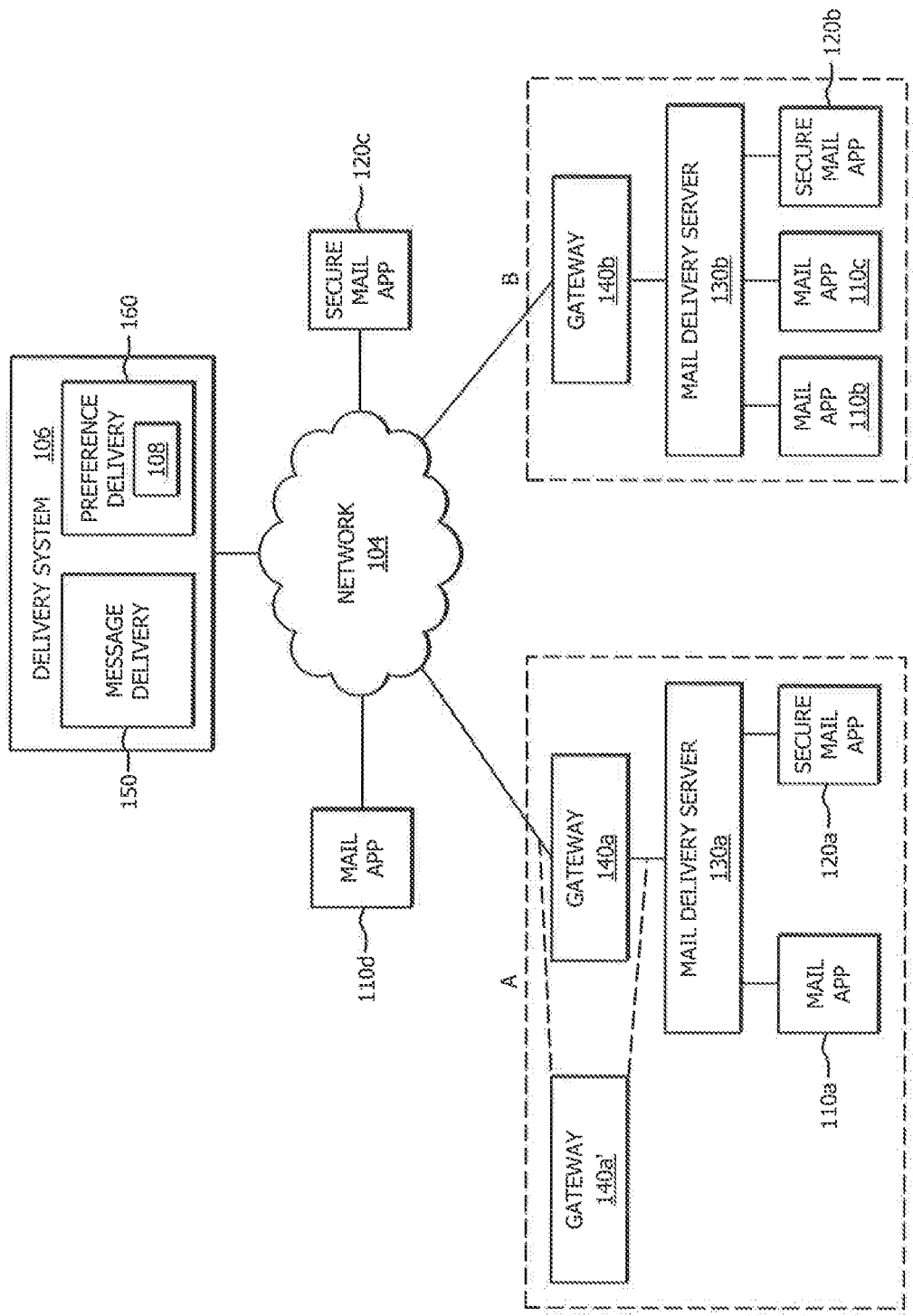
FIG. 1B illustrates an example of a system for electronic delivery of email using distributed recipient preferences.

FIG. 1B illustrates an example of an email system for electronic delivery of email using distributed recipient preferences 108. The email system may include one or more mail applications 110, secure mail applications 120, mail delivery servers 130, and/or gateways 140. Any of mail application 110, secure mail application 120, mail delivery server 130, or gateway 140 may perform some or all of the operations described with respect to client 102 (e.g., sender 102a or recipient 102b) of FIG. 1A depending on the embodiment. FIG. 1B further illustrates an example of delivery system 106 comprising message delivery components 150 and preference delivery components 160.

Mail application 110 may refer to an application through which a user accesses the user's mailbox in order to compose outbound emails, view inbound emails, and so on. Mail application 110 may nm on a user device, such as a laptop computer, desktop computer, mobile phone, etc. Examples of mail application 110 include Microsoft Outlook®, Lotus Notes®, Google Gmail®, and so on. Secure mail application 120 may be similar to mail application 110 and may include additional security functionality. For example, secure mail application may be able to encrypt and decrypt email. In some embodiments, a secure mail plug-in may be used to add the security functionality to a mail application 110 in order to yield secure mail application 120. Mail applications 110 and 120 may be associated with a mail delivery server 130 and/or gateway 140 (e.g., as shown by mail applications 110a, 120a, 110b, 110c, 120b of FIG. 1B) or may be standalone (e.g., as shown by mail applications 110d and 120c of FIG. 1B).

Mail delivery server 130 may refer to a server that delivers email to the user's mailbox. As an example, a Microsoft Exchange® server. In some embodiments, mail delivery server 130 may correspond to a particular domain. For example, mail delivery server 130a may correspond to Company A and may deliver emails to and from the domain @CompanyA.com. As illustrated, mail application 110a may correspond to a user within the domain, such as User_1@CompanyA.com, and secure mail application 120a may correspond to another user within the domain, such as User_2@CompanyA.com. Thus, mail delivery server 130a delivers emails to/from User_1@CompanyA.com and emails to/from User_@CompanyA.com. Mail delivery server 130b may deliver emails within a different domain, such as @CompanyB.com, and may deliver emails to and from mail applications associated with Company B (e.g., as shown in by mail applications 110b and 110c, and secure mail application 120b of FIG. 1B).

Gateway 140 may refer to a mail relay positioned between a private network (such as Company A's network) and an outside network (such as the Internet or Company B's network). In some embodiments, gateway 140 may be positioned at the edge of the private network. As an example, gateway 140a may receive email from mail delivery server 130a, apply policies for sending email to the outside network, and then forward the email to the outside network (e.g. via network 104). Similarly, gateway 140a may receive email from the outside network (e.g., via network 104), apply policies for receiving email from the outside network, and then forward the email to mail delivery server 130a for delivery to the appropriate mailbox. In some embodiments, redundant gateways may be used to provide load balancing, disaster recovery, or other redundancy. For example, gateway 140a' may operate as a redundant gateway for gateway 140a. Gateway 140a and redundant gateway 140a' may each maintain local copies of current preferences 108 so that either gateway is prepared to process email.

Delivery system 106 may comprise message delivery components 150 to facilitate delivery of message 105 from sender 102a to recipient 102b and preference delivery components 160 to facilitate distribution of preferences 108 as further discussed with respect to FIGS. 2-3 below. In some embodiments, message delivery components 150 may include a secure webmail delivery portal, such as a Zix-Port®, that provides secure webmail accounts to users. Mail application 110 or secure mail application 120 may allow the user to interface with the webmail account. To initiate delivery of message 105 using a secure webmail delivery portal, a notification may be communicated to inform a user that delivery system 106 has received message 105. In response, the user may access the user's secure webmail account and retrieve message 105 from delivery system 106. Delivery system 106 may communicate message 105 over a secure connection, such as a Secure Socket Layer (SSL) connection, a Transport Layer Security (TLS) connection, or other secure connection.

Mail applications 110, secure mail applications 120, mail delivery servers 130, gateways 140, and message delivery components 150 may communicate using a shared protocol, such as Simple Mail Transfer Protocol (SMTP). Using the same protocol may allow for sending the email along any suitable path between any suitable sender and recipient. For example, sending mail application 110 (or 120) may send an email directly to a receiving mail application 110 (or 120), directly to a receiving gateway 140 that facilitates delivery of the email to the receiving mail application 110 (or 120), or to message delivery components 150 of delivery system 106 that facilitate delivery of the email to the receiving mail application 110 (or 120) either directly or via a receiving gateway 140. In the preceding example, sending mail application 110 (or 120) may send the outbound email via a sending gateway 140 (e.g., mail application 110a sends email via sending gateway 140a) or independently of a gateway (e.g., mail application 110d sends email directly to the receiving component (e.g., receiving mail application 110 itself or an intermediate receiving component, such as a gateway 140 associated with receiving mail application 110 or message delivery components 150 of delivery system 106).

In some embodiments, the method of email delivery may depend on preferences 108. As an example, if gateway 140a possesses preferences 108 comprising an encryption certificate for gateway 140b, the policy may instruct gateway 140a to send email directly to gateway 140b. But, if gateway 140a does not possess preferences 108 comprising an encryption certificate for gateway 140b, the policy may instruct gateway 140a to send email to gateway 140b indirectly via delivery system 106.

Preferences 108 may be distributed to and applied at any suitable point in the email transmission. As an example, encryption preferences may be applied by secure mail application 120, gateway 140, or message delivery components 150 of delivery system 106. FIGS. 2 and 3 below describe systems and methods for distributing preferences 108 to a client 102, such as gateway 140 or secure mail application 120.

Figure 2:
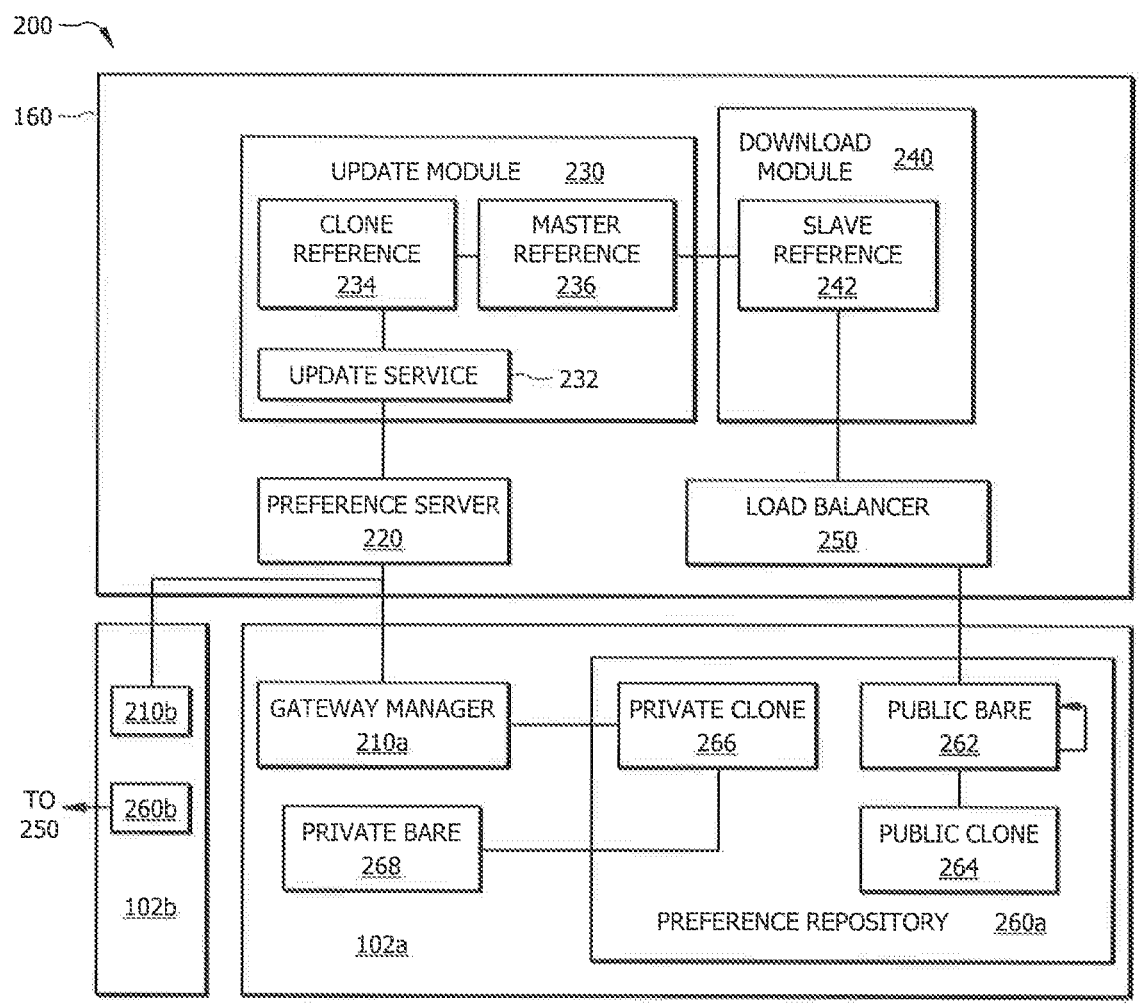
FIG. 2 illustrates an example of components of the system that may facilitate the distribution of recipient preferences.

FIG. 2 illustrates an example of components 200 that may facilitate the distribution of recipient preferences 108 within system 100. In the illustrated example, clients 102 each comprise a gateway manager 210 and a preference repository 260, and delivery system 106 comprises preference server 220, update module 230, download module 240, and load balancer 250. Components 200 may be used to provide sender 102a with one or more preferences 108b associated with recipient 102b. Sender 102a uses preferences 108b associated with recipient 102b when sending message 105 to recipient 102b.

To provide sender 102a with preferences 108b, delivery system 106 must first receive preferences 108b from recipient 102b. Preference server 220 of delivery system 106 may receive preferences 108b from gateway manager 210b residing on recipient 102b. Recipient preferences 108b indicate how recipient 102b prefers messages 105 to be delivered to recipient 102b. As an example, a preference 108b may include an encryption certificate associated with recipient 102b. The encryption certificate may include various attributes, such as a key identifier, a public key, version information, and a signature. Delivery system 106 may distribute the encryption certificate to each client 102 on the network so that clients 102 sending messages 105 to recipient 102b can encrypt the data in a manner that recipient 102b will be able to decrypt using its corresponding private key. S/MIME or any other suitable encryption protocol may be used by clients 102.

In some embodiments, preference server 220 comprises an interface to receive preferences 108b from client 102b. Client 102b may communicate current, up-to-date preferences 108b to preference server 220 in response to an operation that causes preferences 108b to change, such as an add, modify, or remove operation. Logic in preference server 220 may process add, modify, and remove operations and may store current preferences 108b in a preference server database (e.g., a DB2 database) associated with preference server 220.

Preference server 220 may interface with update module 230 residing in delivery system 106 (e.g., a data center). Update module 230 may comprise an update service 232, a clone reference repository 234, and a master reference repository 236. Update service 232 may receive current preferences 108b from preference server 220 and may interact with clone reference repository 234 and master reference repository 236 to facilitate distributing preferences 108b to clients 102.

In some embodiments, update service 232 may comprise a Java-based web application running inside a Tomcat Servlet container with Apache. Update service 232 may use a distributed file version management technology, such as Git, J/Git, Subversion, Concurrent Versions System (CVS), or ClearCase, to manage the version of preference 108 that gets distributed to and stored in the various repositories of delivery system 106 and clients 102.

Initially, update service 232 may create clone reference repository 234 comprising a file structure representation of preferences 108 located in the preference server database (e.g., a DB2 database associated with preference server 220). Once clone reference repository 234 has been created, it may be copied as master reference repository 236 and then downloaded to clients 102 as discussed in more detail below. Reference repositories 234 and 236 may be formatted according to a standardized format used by the file version management technology implemented in the system. As an example, reference repositories 234 and 236 may be Git repositories in systems implementing Git file version management technology.

After creating the initial reference repositories 234 and 236, update service 232 may periodically update the reference repositories 234 and 236. For example, update service 232 may periodically poll preference server 220 to obtain all active preferences including current preferences 108b associated with recipient 102b. Polling may occur at a configurable, pre-determined time interval, such as once every 1 minute, every 2 minutes, every 5 minutes, every 10 minutes, or other suitable time interval. Update service 232 generates clone reference repository 234 by copying master reference repository 236 into a working copy that can be edited by update service 232. The working copy includes previous preferences including preferences 108 that have been previously distributed to clients 102. Update service 232 compares each of the active preferences to the previous preferences to determine differences. For example, update service 232 may determine that recipient 102b's current preferences 108b are missing from clone reference repository 234. Update service 232 then updates clone reference repository 234 by adding current preferences 108b associated with recipient 102b.

In some embodiments, current preferences 108b may include an encryption certificate. Update service 232 may validate the signature of the certificate. If the certificate does not pass validation, the certificate will not be part of the set of certificates that are analyzed to update clone reference repository 234. If the certificate passes validation, update service 232 may compare the hash of the certificate in current preferences 108b to the hash of a corresponding certificate in previous preferences stored in clone reference repository 234. If the hash values are the same, no action will be taken because clone reference repository 234 already has an up-to-date certificate. If the hash values are different, update service 232 will replace the previous certificate with the current certificate. If the certificate does not exist in clone reference repository 234, update service 232 will add it. If clone reference repository 234 contains certificates that are not in the preference server database, update service 232 will delete them from clone reference repository 234.

After update service 232 has made all of the changes to clone reference repository 234, update service 232 may create a commit and signature tag that can eventually be checked by clients 102 to ensure changes to preferences going to clients 102 have not been tampered with. Update service 232 then communicates/copies clone reference repository 234 to master reference repository 236 so that master reference repository 236 has the current state of preferences 108 for the entire system. Either a pull method or, in the alternative, a push method may be used to communicate clone reference repository 234.

Download module 240 facilitates downloading changes from update module 230 to sender 102b and other clients 102 of delivery system 106. For example, download module 240 may pull changes contained in master reference repository 236 into a slave reference repository 242 so that slave reference repository 242 becomes a mirror image of master reference repository 236. The changes may include the additions/modifications according to current preferences 108b. Download module 240 may pull the changes (without having to pull unchanged data) at a configurable, pre-determined time interval, such as once every 1 minute, every 2 minutes, every 5 minutes, every 10 minutes, or other suitable time interval.

Download module 240 accepts and authenticates requests from clients 102 to update the preferences 108. For example, a client 102 may download and store preferences 108 in a preference repository 260 residing in local memory of client 102. In some embodiments, download module 240 may comprise a Java-based web application running in delivery system 106 (e.g., a data center) that utilizes a distributed file version management technology, such as Git, J/Git, Subversion, Concurrent Versions System (CVS), or ClearCase, to manage the version of preference 108 that gets distributed to and stored in preference repository 260 of sender 102a. The web application may run inside a Tomcat Servlet container with Apache. Download module 240 may be associated with a Uniform Resource Locator (URL) that clients 102 access using a Hypertext Transfer Protocol Secure (HTTPS) call. In some embodiments, the HTTPS call will be received by a load balancer 250 between sender 102a and download module 240. The load balancer 250 may provide load distribution and disaster recovery. Sender 102a may call download module 240 at a configurable, pre-determined time interval, such as once every 1 minute, every 2 minutes, every 5 minutes, every 10 minutes, or other suitable time interval.

Sender 102a calls download module 240 to retrieve current preference 108b and any other changes from slave reference repository 242 (e.g., a repository formatted according to a standardized format that corresponds to the file version management technology implemented in the system, such as a Git repository, J/Git repository, Subversion repository, Concurrent Versions System (CVS) repository, or ClearCase repository). As discussed above, in some embodiments, preferences 108b may include an encryption certificate that recipient 102b would like sender 102a to use when sending messages 105 to recipient 102b. In some embodiments, sender 102a may download current preference 108b to public bare repository 262. Sender 102a may use public bare repository 262 to update preferences 108 and to validate the signature tag before committing the changes. Once the updates and validation are complete, public bare repository 262 may be copied (e.g., using a push or pull method) to public clone repository 264. Sender 102a may access public clone repository 264 to obtain preference 108b in the future when it needs to send message 105 to recipient 102b. Thus, preferences 108 may be available to sender 102a in advance. As a result, sender 102a can apply per message preferences 108 without having to wait until the time it begins processing message 105 to get the preferences from delivery system 106 (or another remote resource).

In some embodiments, sender 102a can have a sending policy indicating how to apply recipient preferences 108b. For example, even if sender 102a and recipient 102b support encryption, the policy may instruct sender 102a not to perform encryption in certain circumstances. As sender 102a processes message 105, sender 102 may apply the policy that determines whether or not to encrypt the data. The policy may define encryption decisions based on the identity of the recipient, the sensitivity of the message, or other criteria.

Although the preceding example describes distributing public keys from a sender 102a to a recipient 102b, analogous methods may be used to distribute preferences 108 between any suitable components of system 100. As an example, file version management technology may be used within a private network to distribute private keys or other local preferences from a managing gateway 140a to a redundant gateway 140a'. The redundant gateway 140a' may be located within the same private network and may provide load balancing, disaster recovery, or other redundancy functionality for the managing gateway 140a. Gateway manager 210a associated with managing gateway 140a may use file version management technology to distribute a private key to private clone repository 266 associated with redundant gateway 140a'. When the gateway manager 210a adds/deletes/modifies private clone repository 266, the changes can be committed to private bare repository 268. In some embodiments, changes can be made to private clone repository 266 without having to validate a signature. This is because the private key originates from and is maintained within the private network and is therefore less likely to have been tampered with. The redundant gateway 140a' may then retrieve the up-to-date private keys from private clone repository 266, for example, when it needs to decrypt messages.

Figure 3:
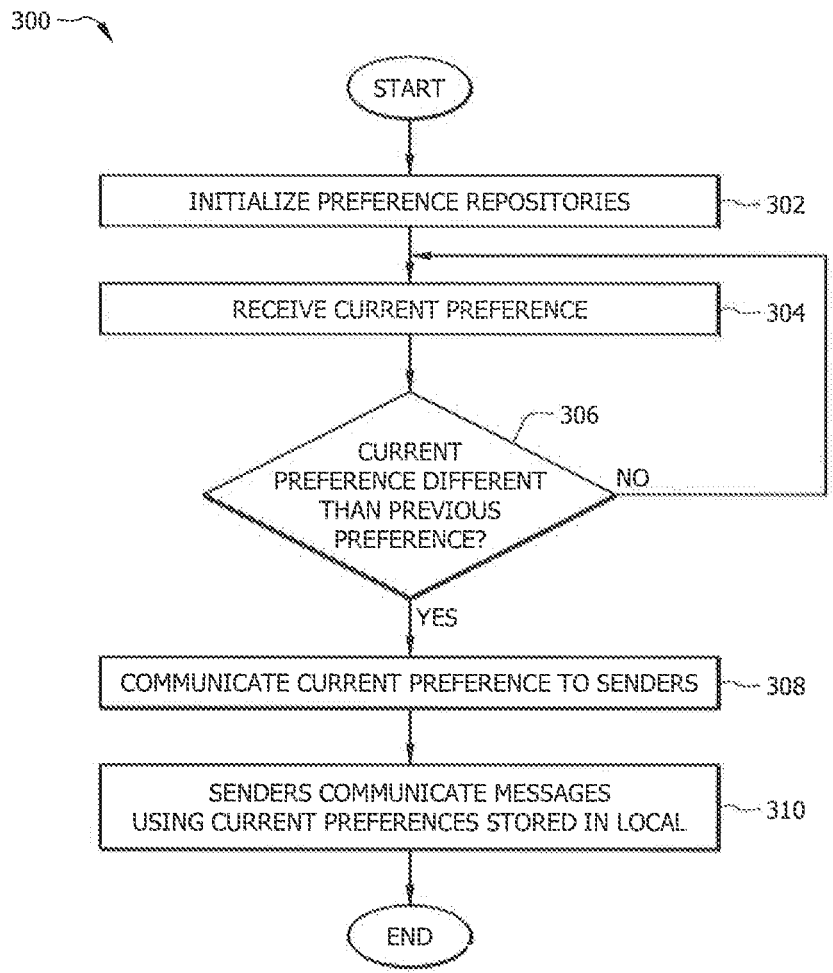
FIG. 3 illustrates an example of a method for electronic delivery of content using distributed recipient preferences.

FIG. 3 illustrates an example of a method 300 for electronic delivery of content using distributed recipient preferences 108. The method may begin at step 302 by initializing the preference repositories throughout the network. For example, update module 230 may receive all active preferences 108 from preference server 220 and facilitate downloading preferences 108 to preference repositories 260 of clients 102 via download module 240.

At step 304, the method receives a current preference 108b at delivery system 106. Current preference 108b indicates how recipient 102b prefers messages 105 to be delivered to it. For example, current preference 108b may include an encryption certificate for encrypting messages 105 being sent to recipient 102b. In some embodiments, recipient 102b communicates current preference 108b to preference server 220 of delivery system 106. Preference server 220 may store current preference 108b in a first format, such as DB2. Update module 230 may periodically receive changed preferences, such as current preference 108b, from a database associated with preference server 220 and may format the changed preferences according to a format used by distributed file version management technology (e.g., Git, J/Git, Subversion, Concurrent Versions System (CVS), or ClearCase).

At step 306, the method determines whether current preference 108b differs from a previous preference that delivery system 106 associates with recipient 102b. For example, update module 230 may clone previous preferences from master reference repository 236 to clone reference repository 234. Clone reference repository 234 may operate as a workspace to identify and validate changes before committing the changes to master reference repository 236. To determine if current preference 108b differs from the previous preference, update module 230 may compare a hash of current preference 108b to the hash of a corresponding previous preference stored in clone reference repository 234. If the hash values are the same, no action will be taken because clone reference repository 234 already has an up-to-date preference. If the hash values are different, update module 230 will replace the previous preference with current preference 108b. If a corresponding preference does not exist in clone reference repository 234, update module 230 will add it. If clone reference repository 234 contains preferences that are not in the preference server database, update module 230 will delete them from clone reference repository 234.

If at step 306 current preference 108b is the same as the previous preference, the method may return to step 304 to receive the next update of current preferences. If at step 306 current preference 108b differs from the previous preference, the method communicates current preference 108 to senders 102a at step 308. Senders 102a include clients 102 that could potentially send a message to recipient 102b in the future. Changed preferences, including current preference 108b, may be periodically downloaded to senders 102a via download module 240. Update module 230 may make the changed preferences available to download module 240 by committing the changes in clone reference repository 234 to master reference repository 236. Download module 240 may periodically update slave reference repository 242 to align with master reference repository 236.

Download module 240 may communicate current preference 108b and other changes to senders 102a in any suitable manner. Download module may use a distributed file version management technology (e.g., Git, J/Git, Subversion, Concurrent Versions System (CVS), or ClearCase) to distribute current preference 108b to senders 102a. Download module 240 may communicate current preference 108b according to a configurable, pre-determined time period. The pre-determined time period may be monitored by download module 240 such that download module 240 periodically pushes current preference 108b to senders 102a. Alternatively, the pre-determined time period may be monitored by senders 102a such that senders 102a periodically pull changed preferences from download module 240. For example, senders may request changed preferences by making HTTPS calls to a URL associated with download module 240. In some embodiments, the HTTPS calls may be received by a load balancer 250 between sender 102a and download module 240 that provides load distribution and disaster recovery. Download module 240 may make current preference 108b available to the plurality of senders 102a concurrently. Thus, any sender 102a that downloads the changed preferences from download module 240 will have up-to-date preferences for all potential recipients 102b in the network (without sender 102a having to know which recipients 102b it will be sending messages to in the future).

Each sender 102a stores current preference 108b in local memory, such as preference repository 260, and applies current preference 108b from local memory in response to future determinations to send a message 105 to the recipient 102b. As a result, sender 102a can support per message application of preferences independently of having to send a request for the preferences to a remote resource (e.g., delivery system 106 or the target recipient 102b) at the time of messaging. Because sender 102a may have recipient 102b's encryption certificate prior to the time of messaging, sender may make local encrypt-if-you-can decisions where sender 102a checks recipient preferences 108 stored in local memory (e.g., preference repository 260) to see if recipient 102b is advertising decryption capability. If recipient preferences 108 indicate that recipient 102b is willing and able to decrypt data, sender 102a can encrypt messages 105 to recipient 102a on an opportunistic basis in the interest of benevolent privacy protection. In some embodiments, sender 102a may apply a sending policy that indicates how to make encrypt-if-you-can decisions.

After receiving current preference 108b from delivery system 106, sender 102a determines to send a message 105 to recipient 108 in step 310. Sender 102a obtains current preference 108b in response to determining to send message 105. Preference 108b is obtained from local memory (e.g., preference repository 260) independently of sending a request for current preference 108b to delivery system 106 or any other remote resource. Sender 102a applies current preference 108b to message 105. For example, sender 102a encrypts message 105 according to an encryption certificate of current preference 108b. Sender 102a then sends message 105 to recipient 102b. For example, sender 102a may send message 105 to delivery system 106 for delivery system to deliver to recipient 102b. The method then ends.

Figure 4:
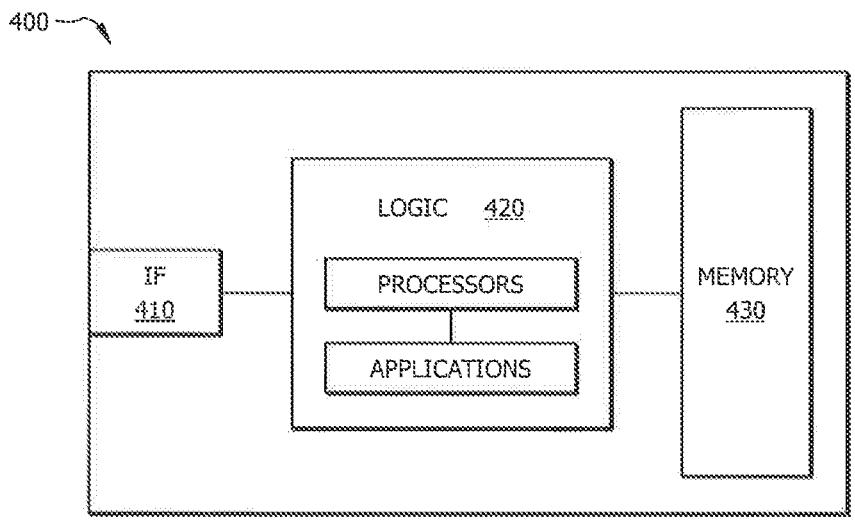
FIG. 4 illustrates examples of elements that may be included in the servers, clients, and network described with respect to FIGS. 1A-1B.

FIG. 4 illustrates an example of elements 400 that may be included in the systems and apparatuses disclosed herein. For example, any of clients 102, network 104, and/or delivery system 106 may include an interface 410, logic 420, memory 430, and/or other suitable element. Interface 410 receives input, sends output, processes the input and/or output, and/or performs other suitable operation. Interface 410 may comprise hardware and/or software.

Logic 420 performs the operations of the component, for example, executes instructions to generate output from input. Logic 420 may include hardware, software, and/or other logic. Logic 420 may be encoded in one or more tangible media and may perform operations when executed by a computer. Certain logic, such as a processor, may manage the operation of a component. Examples of a processor (or processing unit) include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 430 (or memory unit) stores information. Memory 430 may comprise one or more non-transitory, tangible, computer-readable, and/or computer-executable storage media. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Some embodiments of the disclosure may provide one or more technical advantages. A technical advantage of certain embodiments may be the efficient management of recipient preferences within a network. For example, recipient preferences may be distributed to senders and stored in local memory associated with each sender. When a sender needs to transmit data to a recipient, the sender can use the recipient preferences stored in local memory without having to ask a remote resource, such as a central server or the recipient itself, for the preferences. Thus, certain embodiments may reduce or eliminate latencies and/or bandwidth penalties associated with having to ask a remote resource for recipient preferences each time the sender needs to transmit data. Additionally, storing recipient preferences in local memory may allow the sender to access and apply the preferences during a temporary absence of the remote resource.

In some embodiments, efficient management of recipient preferences may facilitate an 'encrypt-if-you-can' sending feature. According to the feature, the sender checks the recipient preferences stored in local memory to see if the recipient is advertising decryption capability. If the recipient preferences indicate that the recipient is willing and able to decrypt data, the sender can encrypt messages to the recipient on an opportunistic basis in the interest of benevolent privacy protection. Without a local store of the recipient preferences, execution of this feature may necessitate some network query to a central resource for every message sent. Such per-message demands can result in the consumption of more internet access bandwidth for policy execution than that required to ultimately transmit the message. The combined effect of such bandwidth demands on the central resource charged with making the data available globally could materially impact the cost and availability characteristics of the entire service.

Some embodiments may benefit from some, none, or all of these advantages. Other technical advantages may be readily ascertained by one of ordinary skill in the art.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A delivery system comprising one or more processors and an interface:
   the interface operable to:
      receive a current preference from a recipient system, the current preference comprising an encryption certificate associated with the recipient system; and
   one or more processors operable to:
      determine that the current preference differs from a previous preference that the delivery system associates with the recipient system;
   the one or more processors further operable to:
      distribute the encryption certificate to a plurality of sending systems in response to determining that the current preference differs from the previous preference, each sending system configured to:
         store the current preference in a local memory of the sending system; and
         in response to a future determination to send a message to the recipient system, apply the current preference from the local memory to the message and send the message directly to the recipient system.

2. The delivery system of claim 1, wherein the interface communicates the current preference according to a predetermined time period.

3. The delivery system of claim 1, wherein the current preference is made available to the plurality of sending systems concurrently.

4. The delivery system of claim 1, wherein the delivery system uses distributed file version management technology to distribute the current preference to the sending systems.

5. The delivery system of claim 1, wherein the encryption certificate comprises one or more of: a key identifier, a public key, information about a version, and a signature.

6. One or more non-transitory computer-readable media comprising logic, the logic when executed by one or more processors operable to:
   receive a current preference from a recipient system, the current preference comprising an encryption certificate associated with the recipient system;
   determine that the current preference differs from a previous preference that the delivery system associates with the recipient system; and
   distribute the encryption certificate to a plurality of sending systems in response to determining that the current preference differs from the previous preference, each sending system configured to:
      store the current preference in a local memory; and
      in response to a future determination to send a message to the recipient system, apply the current preference from the local memory to the message and send the message directly to the recipient system.

7. The logic of claim 6, the logic further operable to communicate the current preference according to a pre-determined time period.

8. The logic of claim 6, wherein the current preference is made available to the plurality of sending systems concurrently.

9. The logic of claim 6, the logic further operable to communicate the current preference to the plurality of sending systems using distributed file version management technology.

10. The logic of claim 6, wherein the encryption certificate comprises one or more of: a key identifier, a public key, information about a version, and a signature.

11. A method, comprising:
   receiving a current preference from a recipient system, the current preference comprising an encryption certificate associated with the recipient system;
   determining that the current preference differs from a previous preference that the delivery system associates with the recipient system; and
   in response to determining that the current preference differs from the previous preference, distributing the encryption certificate to a plurality of sending systems, each sending system configured to:
      store the current preference in a local memory of the sending system; and
      in response to a future determination to send a message to the recipient, apply the current preference from the local memory to the message and send the message directly to the recipient system.

12. The method of claim 11, wherein the current preference is communicated according to a pre-determined time period.

13. The method of claim 11, wherein the current preference is made available to the plurality of sending systems concurrently.

14. The method of claim 11, wherein the current preference is communicated to the plurality of sending systems using distributed file version management technology.

15. The method of claim 11, wherein the encryption certificate comprises one or more of: a key identifier, a public key, information about a version, and a signature.

16. An apparatus comprising one or more processors and an interface;
   the interface operable to receive a preference from a remote resource, the preference comprising an encryption certificate associated with the remote resource; and
   the one or more processors operable to:
      store the preference in local memory;
      determine to send a message to a recipient system after receiving the preference from the remote resource;
      obtain the preference in response to determining to send the message, the preference obtained from the local memory independently of sending a request for the preference to the remote resource; and
      apply the preference to the message;
   the interface further operable to send the message directly to the recipient system;
   wherein the remote resource receives the current preference from the recipient system.

17. The apparatus of claim 16, the one or more processors further operable to:
   determine, based on the preference, whether the recipient system supports decryption; and
   apply an encrypt-if-you-can policy to the message if the recipient system supports decryption.

18. The apparatus of claim 16, the one or more processors further operable to periodically request updated preferences from the remote source according to a pre-determined time period.

19. The apparatus of claim 16, the one or more processors configured to use distributed file version management technology to receive the preference from the remote resource.

20. The apparatus of claim 16, wherein the encryption certificate comprises one or more of: a key identifier, a public key, information about a version, and a signature.

* * * * *